United States Patent
Kalinichenko et al.

(10) Patent No.: US 7,606,799 B2
(45) Date of Patent: Oct. 20, 2009

(54) CONTEXT-ADAPTIVE CONTENT DISTRIBUTION TO HANDHELD DEVICES

(75) Inventors: Boris Olegovich Kalinichenko, Jamaica Plain, MA (US); Joseph G. Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 309 days.

(21) Appl. No.: 11/033,960

(22) Filed: Jan. 12, 2005

(65) Prior Publication Data

US 2006/0155706 A1 Jul. 13, 2006

(51) Int. Cl.
*G06F 7/00* (2006.01)
*G06F 17/30* (2006.01)

(52) U.S. Cl. .................................... 707/7; 707/3; 707/5
(58) Field of Classification Search ........................ None
See application file for complete search history.

(56) References Cited

U.S. PATENT DOCUMENTS

| | | | | |
|---|---|---|---|---|
| 5,703,655 | A * | 12/1997 | Corey et al. | 348/468 |
| 6,356,905 | B1 * | 3/2002 | Gershman et al. | 707/10 |
| 6,778,979 | B2 * | 8/2004 | Grefenstette et al. | 707/3 |
| 6,928,407 | B2 * | 8/2005 | Ponceleon et al. | 704/253 |
| 7,089,237 | B2 * | 8/2006 | Turnbull et al. | 707/5 |
| 7,151,548 | B1 * | 12/2006 | Hirono | 345/629 |
| 7,221,370 | B1 * | 5/2007 | Arnold et al. | 345/581 |
| 7,346,042 | B2 * | 3/2008 | Horiguchi et al. | 370/352 |
| 2001/0051876 | A1 * | 12/2001 | Seigel et al. | 705/1 |
| 2002/0016801 | A1 * | 2/2002 | Reiley et al. | 707/523 |
| 2002/0077741 | A1 * | 6/2002 | Hanebrink | 701/117 |
| 2003/0187952 | A1 * | 10/2003 | Young et al. | 709/219 |
| 2004/0002972 | A1 * | 1/2004 | Pather et al. | 707/6 |
| 2004/0025180 | A1 * | 2/2004 | Begeja et al. | 725/46 |
| 2004/0205157 | A1 * | 10/2004 | Bibelnieks et al. | 709/218 |
| 2005/0003804 | A1 | 1/2005 | Huomo et al. | |
| 2005/0229118 | A1 * | 10/2005 | Chiu et al. | 715/864 |
| 2005/0240580 | A1 * | 10/2005 | Zamir et al. | 707/4 |
| 2005/0278642 | A1 * | 12/2005 | Chang et al. | 715/751 |
| 2006/0167942 | A1 * | 7/2006 | Lucas et al. | 707/104.1 |

OTHER PUBLICATIONS

Kolari et al., "Context-Aware Services for Mobile Users Technology and User Experiences", Jun. 2004, VTT Publications.*
Bothorel et al., "How to Use Enriched Browsing Context to Personalize Web Site Access", LNCS, vol. 2680, pp. 419-426, Springer, Heidelberg, 2003.*
Sadeh et al. , "A Semantic Web Environment for Context-Aware M-Commerce", Proceedings of the ACM Conference on Electronic commerce, Jun. 2003, pp. 268-269.*

* cited by examiner

*Primary Examiner*—Khanh B Pham
*Assistant Examiner*—Shew-Fen Lin
(74) *Attorney, Agent, or Firm*—Proskauer Rose LLP

(57) ABSTRACT

Described are methods and apparatus, including computer program products, for context-adaptive content distribution to handheld devices. Context data associated with the user is retrieved and a relevancy function is determined based on the context. A list of content available to the user is obtained. The list of available content is dynamically sorted based on the relevancy function. At least a portion of the list is transmitted to the handheld device according to the sorted order.

31 Claims, 6 Drawing Sheets

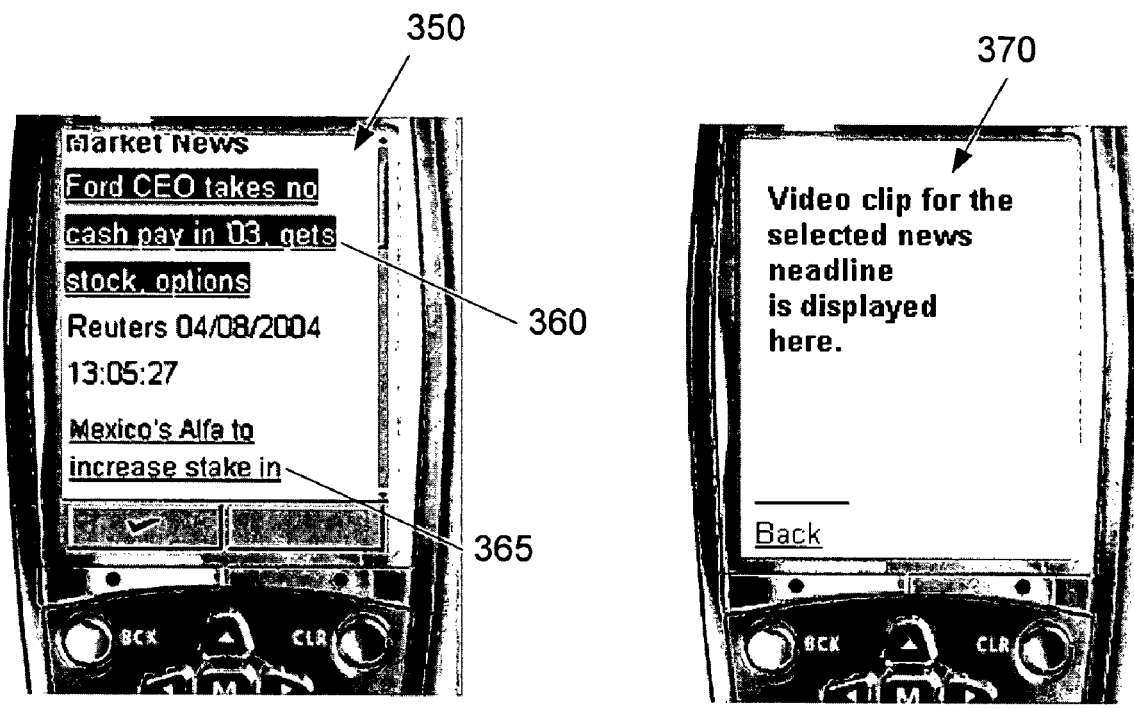
FIG. 3E　　　　　　　FIG. 3F

500

| Beginning of a file 520 | Beginning of a second logical section 570 | Beginning of a first logical section 550 | Keyword 540 | End of a first logical section 560 | End of a second logical section 580 | End of file 530 |
|---|---|---|---|---|---|---|
| Video data 510 ||||||||

FIG. 5

CONTEXT-ADAPTIVE CONTENT DISTRIBUTION TO HANDHELD DEVICES

FIELD OF THE INVENTION

The present invention relates to computer-based methods and apparatuses, including computer program products, for context-adaptive content distribution to handheld devices.

BACKGROUND

Handheld devices, such as mobile telephones, continue to have increased computing and display capabilities. For example, many models of mobile telephones include color displays and increased memory capacity that enable a user to view photographs and short videos and play video games. Further, some models include a browser to enable a user to retrieve content from a network, such as the Internet. Due to the limited display area, only a small portion of what a user might see using a typical web browser on a desktop computer is displayed on a handheld device. This requires the user to do much more navigation (e.g., button pressing) to view a typical web page. Further, much content is statically indexed, typically in a hierarchical fashion. For example, a medical site might have an initial category page with the major parts of the body. Then upon selection of one part of the body, there is another page with a list of sub-parts of the body within the major part selected. Selection of a sub-part would result in another page of sub-sub-parts, etc., continuing in this hierarchical fashion until the bottom of an index tree is reached. If reaching certain content takes too many button presses, a user may simply give up and decide not to go to or view that content.

SUMMARY OF THE INVENTION

The techniques described herein feature an automated tool that includes computer-based methods and apparatuses, including computer program products, for context-adaptive content distribution to handheld devices. In general in one aspect, there is a computerized method for context-adaptive content distribution to handheld devices. The method includes retrieving context data associated with the user and determining a relevancy function based on the context. The method also includes obtaining a list of content available to the user, dynamically sorting the list of available content based on the relevancy function, and transmitting at least a portion of the list to the handheld device according to the sorted order.

In another aspect, there is a system for context-adaptive content distribution to handheld devices. The system includes a computing device that is configured to retrieve context data associated with the user and determine a relevancy function based on the context. The computing device is also configured to obtain a list of content available to the user, dynamically sort the list of available content based on the relevancy function, and transmit at least a portion of the list to the handheld device according to the sorted order.

In another aspect, there is a computer program product, tangibly embodied in an information carrier, for context-adaptive content distribution to handheld devices. The computer program product includes instructions being operable to cause data processing apparatus to retrieve context data associated with the user and determine a relevancy function based on the context. The computer program product includes instructions being operable also to cause data processing apparatus to obtain a list of content available to the user, dynamically sort the list of available content based on the relevancy function, and transmit at least a portion of the list to the handheld device according to the sorted order.

In other examples, any of the aspects above can include one or more of the following features. The content can include video content. The content can include audio content. The video content can represents a portion of a video file less than the entire video file. The video content can be dynamically converted from a first format to a second format prior to transmitting. A file can be obtained including video content and audio content, and a portion of the file can be selected based on the audio content. The audio content can be converted into text. The audio content can be searched for keywords. The portion of the file can be determined based on the keyword. The portion of the file can be determined based on grammatical structure. The portion of the file can be determined based on a change in video content. A relevancy function can be employed for dynamically sorting. The context data can include navigation data preceding dynamically sorting the list. The context data can include location data. The location data can be obtained based on a GPS. The location data can be obtained from a service provider associated with the handheld device. The location data can be obtained from a home location register (HLR) associated with the service provider. The context data can include user data. The context data can include usage history associated with the user. The context data can include regulatory rules associated with the user. The content can be indexed. The handheld device can include a mobile telephone.

Implementations can realize one or more of the following advantages. A user does not have to repeatedly press buttons and scroll through screen after screen of titles to find content of interest. The service provider sorts available content using context data, so the user is always seeing the most relevant content first. Network bandwidth requirements are smaller because the user does not need to keep requesting screen after screen to find the desired content. Users rely more on the technology, increasing revenues for service providers, since they are able to get to the desired information instead of giving up in frustration due to excessive navigation. The user experience is better, as it takes less time to get the desired content than, for example, navigating through static, hierarchically arranged content. One implementation of the invention provides at least one of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

FIGS. 3A-3F are screen shots illustrating an exemplary process of context-adaptive content distribution on a handheld device.

FIG. 5 is a block diagram of a logical representation of a video file.

DETAILED DESCRIPTION

Figure 1:
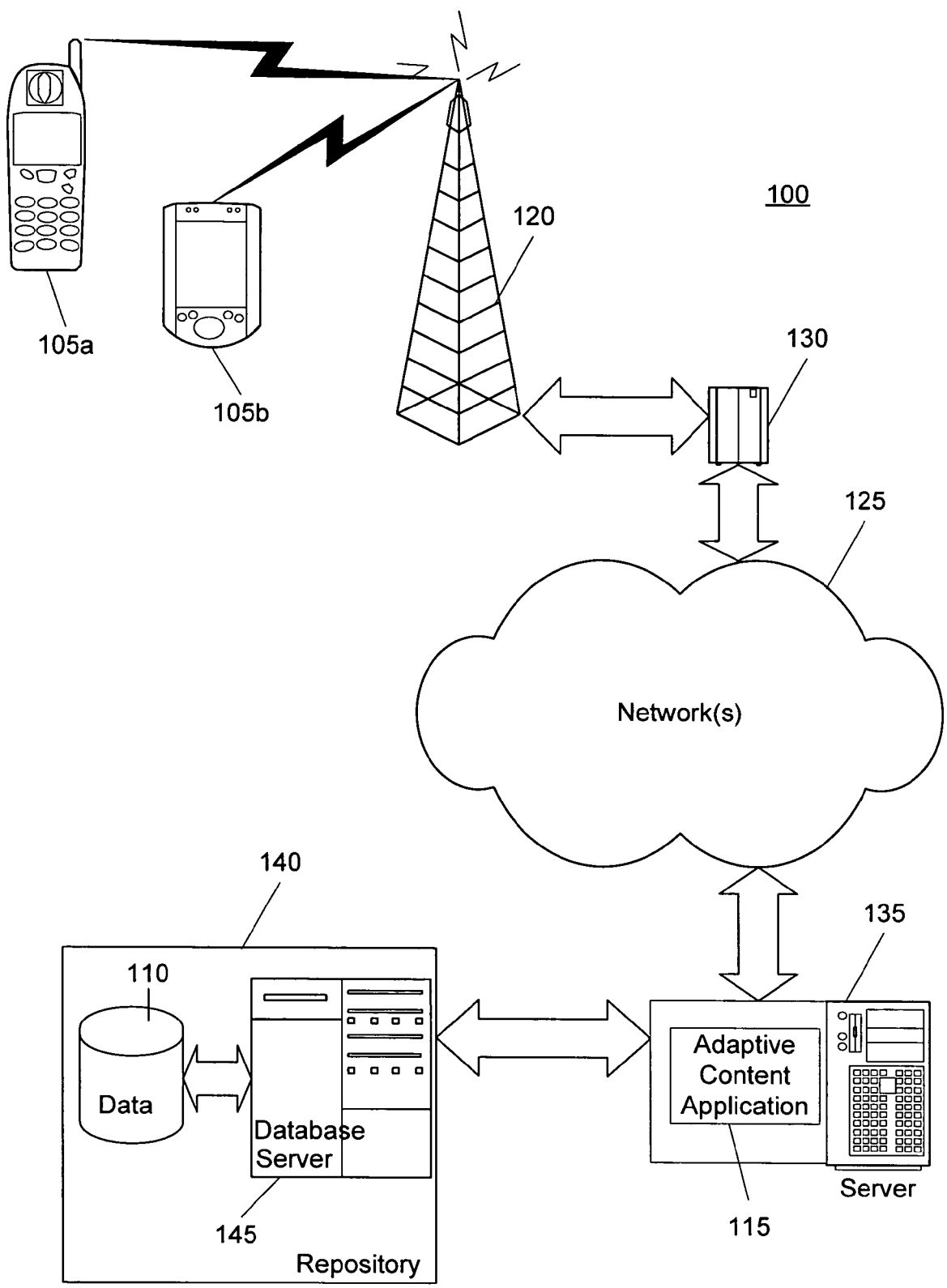
FIG. 1 is a block diagram of a system for context-adaptive content distribution to handheld devices.

FIG. 1 illustrates a system 100 that can be used for context-adaptive content distribution to handheld devices. In general overview, a user uses a handheld device (generally referred to as 105), such as a mobile telephone 105a or a PDA 105b, to retrieve information of interest. This information (also referred to as content) is stored in one or more databases. The one or more databases are represented in FIG. 1 as database 110. The content stored in database 110 that is available to a user is generally quite large. Due to the limitation of the screen size of the handheld devices 105, the retrieval process uses an adaptive content application 115 to sort the available content according to the context of the retrieval.

For example, if the user had been previously navigating to financial web pages and pages on buying stock, the adaptive content application 115 saves this navigation information and associates it with the user. When a subsequent request for information on the keyword "Ford" is received by the application 115 from the user, the application 115 sorts available "Ford" content according to the stored navigation data. This creates a listing where any content dealing with stock price or financial data is considered the most relevant and first to be listed on the user's handheld device 105. The user is most likely looking for information on the stock price of Ford and will find it at the top of the list of available content. Advantageously, this enables the user to retrieve the desired content of interest without having to use many button clicks and without having to use much network bandwidth and time to download many titles of all of available content. In other words, if the handheld device 105 and network 100 are configured to download only 4 titles at a time, if the desired content is within those first four titles, only a single download of titles is required.

For the communication path illustrated in FIG. 1, the handheld devices 105a and 105b communicate wirelessly with an antenna 120 that receives signals from and transmits signals to the handheld device 105. The antenna 120 is in communication with a wide area network (WAN) 125 via a switch (and/or some kind of gateway) 130. The WAN 125 illustrates one or more general communication networks and can include, for example, both circuit-based and packet-based networks, such as a public switched telephone network (PSTN) and the Internet. An application sever 135 is in communication with the network 125 to receive signals from and transmit signals to the handheld device 105. In some examples, the handheld device 105 includes a browser, such as a NetFront mobile browser by Access Co., Ltd. of Japan or an Openwave® mobile browser by Openwave Systems Inc. of Redwood City, Calif., to communicate over an IP network. In such examples, the browser communicates with the application sever 135 (typically via an upstream web server (not shown)) using a stateless protocol, such as HTTP.

The communication between the application server 135 and the handheld device 105 can also involve other common network devices (not shown), such as, firewalls, routers, edge servers, etc. The adaptive content application 115 is a software program that executes on the application server 135. The adaptive content application 115 and the application server 135 are in communication with a repository 140 that includes the one or more databases 110 and some interface for retrieving content from the database 110, such as a database server 145. Although not shown, the adaptive content application 115 and the application server 135 can be in communication with other databases via the network 125.

Figure 2:
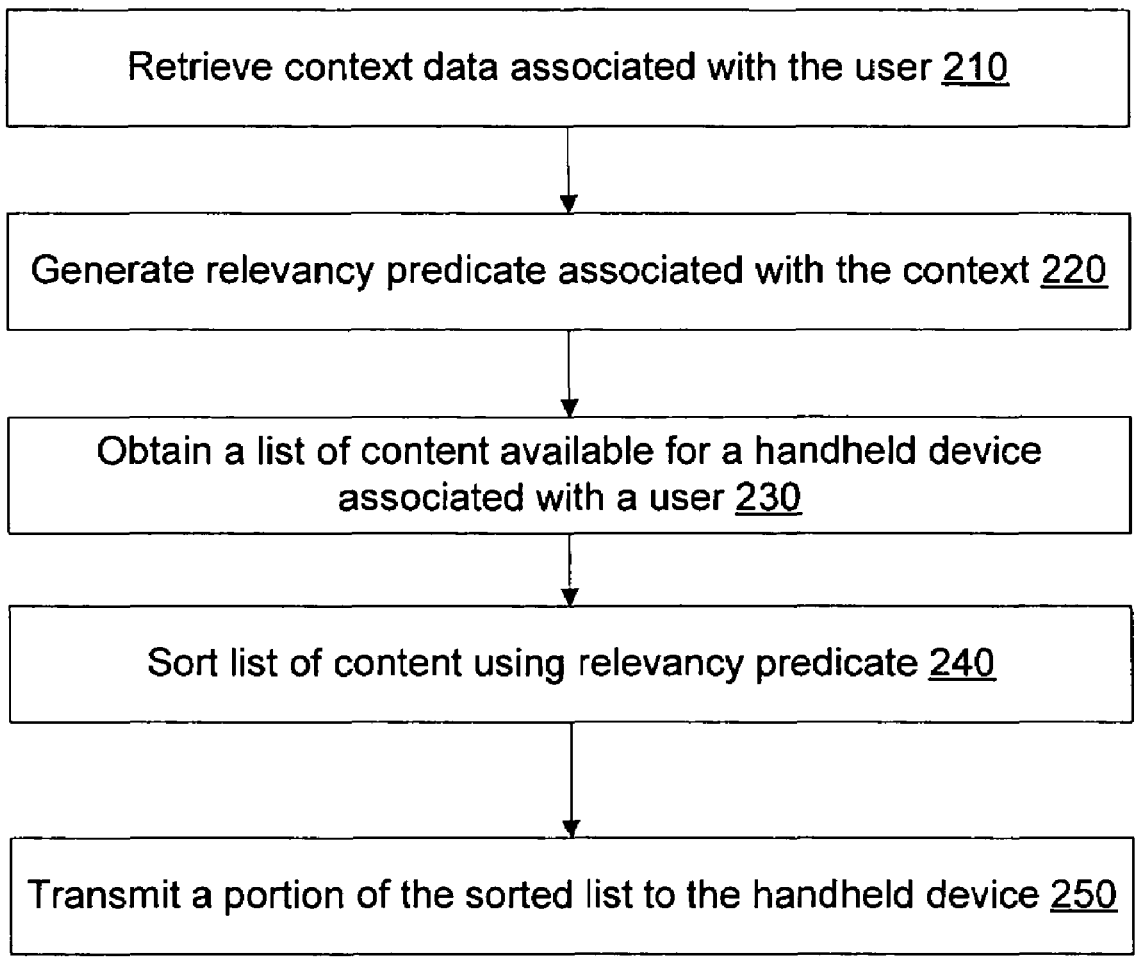
FIG. 2 is a block diagram of a process for context-adaptive content distribution to handheld devices.

FIG. 2 illustrates a process 200 that can be used, for example, by the adaptive content application 115, to provide context-adaptive content distribution to handheld devices. The application 115 retrieves context data associated with the user (210). As described in an example above, the context data can include references to web pages to which the user has navigated. The navigation history can be defined using a time period, for example, the pages to which the user has navigated in the previous five minutes. The navigation history can be defined using a previous number of navigation steps, for example the last ten pages to which the user has navigated. The context data can include more than just the URL of the stored web pages. The context data can include the subject matter of the web pages. For example, web pages written in HTML can use the "META" tag to define keywords, indices, or some other service provider defined values that can be used by the application 115 to assess context when sorting the content.

Context data can include the capabilities of the handheld device, for example the screen size of the device. The context data can include the network bandwidth, as network bandwidth can define the maximum video frame refresh rate. A higher refresh rate can enable a better quality of the video content, however a higher refresh rate can also cause higher impact on the underlying network (e.g., the network 125). For example, if the refresh rate is too high, the picture quality can be worse than the picture quality of the lower refresh rate content because higher refresh rate content can require buffering, causing the video content to be interrupted. To obtain the content data, information such as the screen size and the refresh rate information can be transmitted by the browser executing in a mobile device 105, or can be stored in a database (e.g., the database 110, or a database managed by a service provider, such as a phone carrier (e.g., a HLR database)) and accessed from this database by using some other data sent by the browser. For example, requests coming from the mobile browser can come into the server (e.g., the server 135) through a gateway (e.g., the gateway 135). This gateway has an IP address and this IP address can be accessed by the server 135. The server 135 can determine what phone carrier owns this gateway by looking at this IP address. The mobile browser can also send some identification information to the server, such as HTTP headers as "User-Agent". By looking at this and other headers, it is possible to determine the specific device and browser used on that device. Having determined the carrier and the device type, the application 115 can determine the screen size and the maximum refresh rate that the device/browser supports with minimum deterioration of the content quality.

The application 115 generates a relevancy predicate associated with the context data (220). For example, if the user logs into a Fidelity wireless application and then clicks on the link "Investment Ideas", the relevancy function generated uses the identity of the user (e.g., age, address, current portfolio, credit history, family status, where the user works, how much the user makes, etc.), historical data associated with the user (e.g., an active trader will not be that interested in "buy and hold" strategy, as some of them will not ever carry a position overnight, while other investors will not behave this way), what Fidelity offered the user before and how well the user reacted to it The application 115 obtains a list of content available for a handheld device associated with a user (230). For example, a user can be navigating through some web pages on a cellular telephone (e.g., 105a). A hyperlink on one of the pages might be titled "Video News Clips." When the user selects this hyperlink, the application 115 obtains a web page indicated in the URL associated with the selected hyperlink. The obtained web page includes a list (e.g., file names embedded as hyperlinks in the obtained web page) of all of the video news clips available in the database 110.

With the list of available content and the context data, the application 115 sorts the list of content based on the context data (240). The sorting process uses the generated relevancy predicate that ranks the available content by relevancy to the context data. The application 115 then sorts the list of content by relevancy ranking, for example, placing the most relevant content at the top of the list. As an illustrative example, the application 115 receives a request from a user for video news clips related to Ford. The application queries the repository 140 for any video new clips related to Ford. The application also obtains the navigation history for that particular user. The navigation history contains context data values such as financial, stock, earnings reports, etc. The application 115 uses a relevancy faction so that any of the Ford video news clips that are associated with financial, stock, and earnings reports are ranked at the top of the list. Video clips that are advertisements or related to dealerships are ranked lower. It is noteworthy that the sorting is based on the context data for the user requesting the content. For example, another user makes the same request for video clips related to Ford. The navigation history for this other user, however, contains context data values such as buying, dealers, new products, etc. The application 115 uses the relevancy function and arrives at different results. Any of the Ford video news clips that are associated with buying, dealers, and new products are ranked at the top of the list. Video clips dealing with stock prices and earnings reports are ranked lower.

With a sorted list of available content, the application 115 transmits a portion of the sorted list to the handheld device 105 (240). The size of the portion of what is transmitted to the handheld device 105 can be determined by the application 115 and/or can depend on one or more factors, such as limitations of the network(s) through which the data is transmitted (e.g., the bandwidth available to transmit the data) and/or limitations of the handheld device 105 (e.g., the size of memory available on the handheld device 105). Prior to transmitting the requested video file, the application 115 can perform a dynamic conversion of the requested video file. The conversion can be based on the device parameters and the network capabilities.

Figure 3A:

FIGS. 3A-3F illustrate examples of screenshots that can be displayed on a handheld device 105. FIG. 3A illustrates a screen shot 300 that gives a list of categories of content available to the user. This list can be a standard page displayed to all users communicating with this particular service provide. This list also might be a sorted list generated by the application 115 for this particular user. In such an example, the context data can be usage history for this particular user. For example, in the list in the screen shot 300, in the past this particular user has selected the "Quotes" content the most times, the "Market Info" content the second most times, and so on. The relevancy function here is one where the hyperlinks in the list are ranked according to the stored number of times the user has selected that hyperlink over some period of time. With such a relevancy function, the hyperlink with the most selections over time is ranked the most relevant.

The usage history as context data can be even further fine tuned. For example, the context data can also have time dependent or day dependent usage history. In such examples, during the daytime on a weekday, the list in the screenshot 300 represents the frequency of content selection, but then after 6:00 pm, or on the weekends, the usage history changes, with content selection based more on a personal hobby, such as photography. In such examples, the application 115 uses this context data accordingly when dynamically generating the list at the time the request for the list is made. In some examples, the usage history for a user can be stored in repository 140.

Figure 3B:
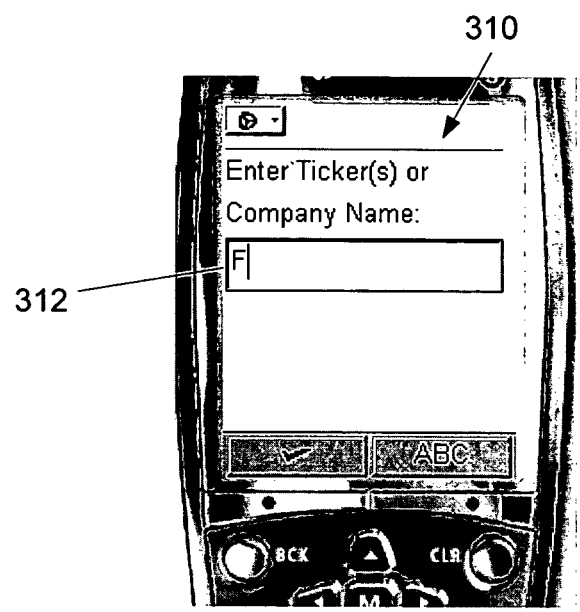
Figure 3C:
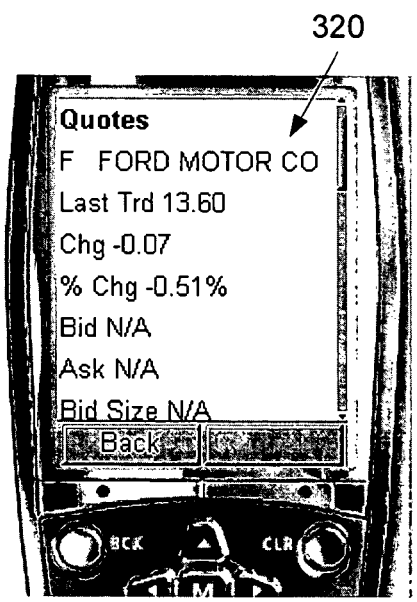
Figure 3D:
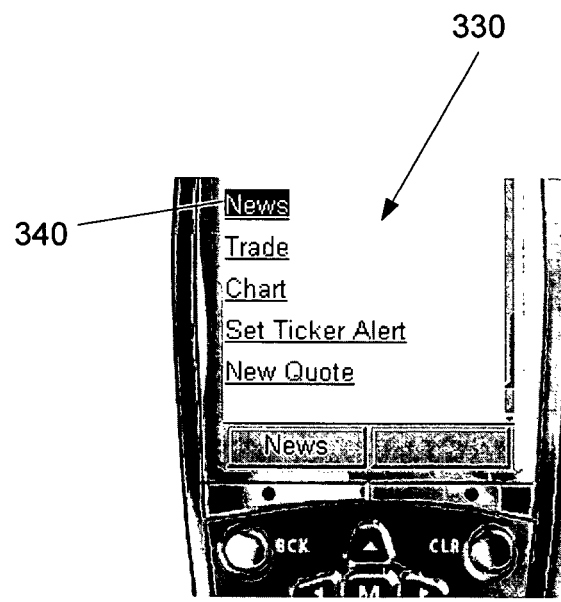

FIG. 3B illustrates a screen shot 310, to which the user navigates when the user selects the "Quotes" content listed in the screen shot 300. The screen shot 310 shows a text box 312 in which the user enters the ticker symbol F to retrieve quotes information on the Ford Motor Company. FIG. 3C illustrates a screen shot 320 that displays quote data for the entered ticker symbol in the screen shot 310. FIG.3D illustrates a screen shot 330 that is the bottom portion of screen shot 320. In other words, after viewing the financial data on the screen shot 320, the user scrolls the screen to view the hyperlinks included in screen shot 330. The user selects a "News" hyperlink 340.

FIG. 3F illustrates a screen shot 350 that is generated in response to the selection of the hyperlink 340. The screen shot 350 shows a sorted list generated by the application 115 using, for example, the process 200. The first title in the list is a hyperlink 360, representing the title of an available news clip "Ford CEO takes no cash pay in '03, gets stock options." This news clip is ranked first according to the context data because the associated content is related to "Ford" and also relevant to the navigation context of the user, specifically a financial and stock price related context. The next title in the list is a hyperlink 365, representing the title of an available news clip "Mexico's Alfa to increase stake in . . . ." This news clip is ranked next according to the context data because the associated content is also related to "Ford" and also relevant to the navigation context of the user, specifically a financial and stock price related context. It is noteworthy that in the exemplary handheld device screen, the first title in the sorted list in the screen shot 350 fills half of the screen. FIG. 3F illustrates a screen shot 370 that is generated in response to the user selecting the hyperlink. Although the screen shot 370 shows text, as the text indicates, in a real-life situation, a video clip associated with the hyperlink 360 is played in the screen shot 370.

The examples above use context data that includes navigation data and usage history data associated with a user. The context data can be based on other data also. For example, the context data can be based on location data, on user data, regulatory rules data. For location data, the application 115 obtains the present location of the user. For example, many handheld devices have GPS capability that can be queried by a browser or Java application executing on the handheld device. This information can be transmitted to the application 115 and used by the application 115 to sort the list of content sent back to the user so that the content most relevant to the user's present location is at the top of the list. As an alternative to GPS, some mobile phone service providers use triangulation of signals transmitted by the user's handheld device to determine the location of the user. This information can be queried by the application 115 (e.g., by querying the HLR of the service provider via the network 125).

The user data can be used in several ways to determine context data. As described above, the usage history of the user can be stored and accessed to determine relevancy based on historical behavior of the user. In other examples, the user data can be used to create a profile of the user. This profile data can be compared to a generic usage history based on some predefined profiles. In other examples, the user data can be used to determine specific content the user would want to see based on the type of the user. For example, in the financial context, users can have different accounts and different abilities to perform fund transfers and trades. In some examples, the video content includes instructional video clips of how to perform specific find transfers and trades. For example, a level one user has certain capabilities, a level two user has certain increased capabilities more than that a level one user, a level three user has certain increased capabilities more than that a level two user, and so on. In such examples, the application 115 can use the user level as context data, to sort the video content list according to the appropriate level.

The level of the user can also be tied into the regulation rules data used as context data. For example, for certain types of trade capabilities, regulations (e.g., SEC regulations) may dictate certain trading materials that must be presented to the user. The application 115 can use this regulation data as part of the context data and assign the highest relevancy to the video content required by the regulations.

Figure 4:
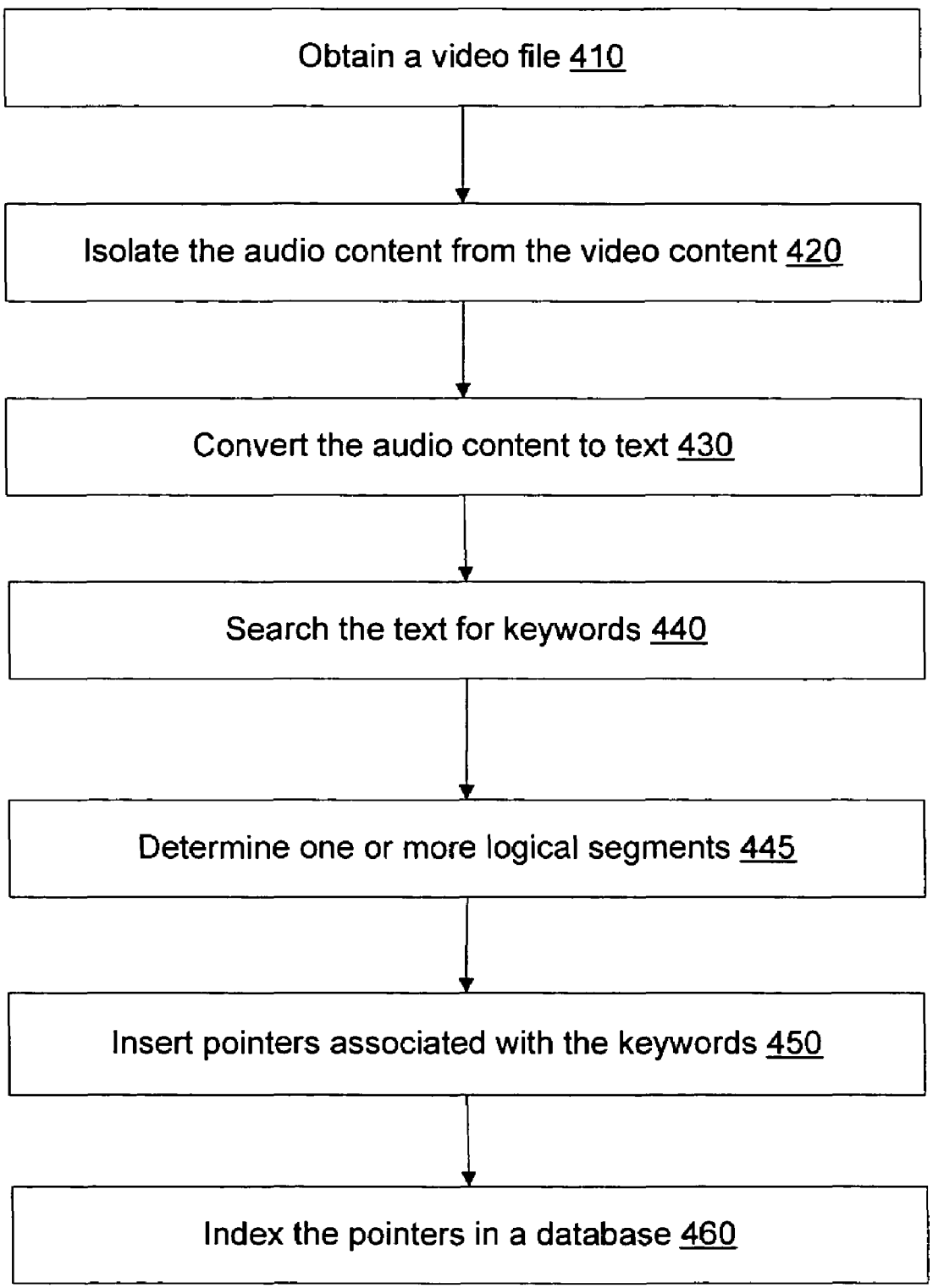
FIG. 4 is a block diagram of a process used to index video content.

FIG. 4 illustrates a process 400 that the application 115 can perform to index video content and portions of video content. The application 115 obtains a video file (410) (e.g., a MPEG formatted file). The application 115 isolates the audio content from the video content (420). The application 115 converts the audio content to text (430) (e.g., using a commercially available speech-to-text conversion engine). The application 115 searches the text for keywords (440). Using the keywords, the application 115 determines one or more logical video segments (445) and inserts pointers associated with the keywords (450) to mark the one or more logical segments, as well as the keyword. The application 115 indexes the pointers in the database 110 (460). Alternatively, the video file can be stored as multiple files, broken up into portions according to the keywords and/or converted into alternative video formats (e.g. into Windows Media codec with 14 frames/second refresh rate). Then when the context data indicates, the application 115 can return as part of the list of available content representatives of the pointers that indicate the portions of the video content most relevant to the context data. In other words, the video content can be more fined tuned so that only relevant portions of the video are transmitted to and viewed on the user's handheld device, again advantageously limiting the amount of bandwidth used for such a transfer and amount of a wait time for getting into the content.

Determination of a logical video segment (445) is based on finding keywords in the audio file and determining the beginning and the end of a logical data segment that includes these found keywords. The fact that, for example, the keyword is found in the second sentence of an audio file does not lead limiting the beginning of the content to the keyword itself. The application 115 reads the audio file to find a beginning of the logical segment (for example a segment that started after a long pause or segment associated with a change of the video background) and the end of a logical video segment that can be marked by another long pause of another change of the video background.

FIG. 5 illustrates a logical representation of a video file 500 to use as an example. The video file 500 includes video data 510. The video data 510 is associated with several pointers representing different portions of the video data 510. There is a first pointer 520 that indicates the beginning of the video file 500. There is a second pointer 530 that indicates the ending of the video file 500. There is a third pointer 540 that indicates the location of the keyword in the video file 500. There are a fourth pointer 550 and a fifth pointer 560 that indicate the locations of the start and finish, respectively, of a first logical section in the video file 500. There are a sixth pointer 570 and a seventh pointer 580 that indicate the locations of the start and finish, respectively, of a second logical section in the video file 500.

The first and second logical sections include the keyword. As described above, the logical sections can be determined based on the video data (e.g., a change in the background, a fadeout, etc.) and/or based on the audio data (e.g., a long pause). In addition to these examples, the logical section can also be based on grammatical structure of the audio data. For example, the first logical portion can be a sentence that includes the keyword. The application 115 can use the speech-to-text engine to identify the sentence boundary once the keyword is found. Similarly, the second logical section can be a larger grammatical unit, such as a paragraph that includes the keyword. The logical sections can also be based on subject matter. For example, the video data 510 can represent a news cast. The larger second logical section can represent the sports portion of the news cast. The smaller first logical section can represent a segment in the sports portion that discusses football.

In operation, the logical sections can be used by the application 115 in a variety of ways. For example, the application 115 can include in the sorted list the different logical sections as separate entries. If the video file is stored as different files, based on the logical sections, then each entry can be associated with the respective file. In other examples, the application 115 can include only the smallest logical section in the sorted list. If selected, the application 115 transmits the first logical section to the user's handheld device. At the end of displaying the first logical section, the user is queried as to whether the user wants to view more of that video file. Upon indicating a desire to view more, the application 115 transmits the larger second logical section. This viewing and querying can be repeated, each time going to a larger logical section of the video file, until the entire video file has been viewed.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A computerized method for context-adaptive content distribution to a handheld device, the method comprising:
    determining, by a computing device, one or more logical segments of content based on information associated the content;
    retrieving, by the computing device, context data, which comprises subject matter information, financial portfolio information, regulatory rule information, or any combination thereof, associated with a user, during at least a first predetermined period of time, the context data further comprising web navigation history data associated with the user from an immediately preceding second predetermined period of time;
    determining, by the computing device, a type of the handheld device associated with the user;
    determining, by the computing device, a phone carrier for the handheld device based on an IP address associated with the handheld device;
    wherein determining the phone carrier for the handheld device comprises:
        determining a gateway transmitting requests from the handheld device;
        accessing the IP address, wherein the IP address is associated with the gateway; and
        determining the phone carrier, wherein the phone carrier owns the gateway;
    determining, by the computing device, limitations associated with the handheld device based on the type of the handheld device and the phone carrier, where in the limitations include a screen size for a browser of the handheld device, a maximum refresh rate that the handheld device supports, and a size of memory available on the handheld device;
    determining, by the computing device, a relevancy function based on the context data;
    obtaining, by the computing device, a list of content, which comprises at least one logical segment, available to the user based on the context data;
    ranking, by the computing device, the list of content by relevancy to the context data based on the relevancy function;
    dynamically sorting, by the computing device, the ranked list of available content; and
    transmitting, by the computing device, a portion of the ranked list to the handheld device according to the sorted order, wherein the portion of the ranked list is determined based on the limitations associated with the type of device and limitations of a network through which the portion of the ranked list is transmitted.

2. The method of claim 1, wherein the content comprises video content, audio content, or both.

3. The method of claim 2, wherein the video content represents the portion of a video file less than the entire video file.

4. The method of claim 2, further comprising dynamically converting, by a computing device, the video content from a first format to a second format prior to transmitting.

5. The method of claim 2, wherein the determining one or more logical segments is further based on the video content, audio content, or both.

6. The method of claim 5, further comprising searching, by a computing device, the audio content for a keyword, which is selected based on the content.

7. The method of claim 6, wherein the determining one or more logical segments is further based on the keyword.

8. The method of claim 6, further comprising indexing the file into logical segments based on the keyword.

9. The method of claim 5, wherein the determining one or more logical segments is further based on grammatical structure.

10. The method of claim 5, wherein the determining one or more logical segments is further based on a change in video content in a file.

11. The method of claim 5, further comprising converting the audio content to non-audio content.

12. The method of claim 1, wherein dynamically sorting further comprises employing a second relevancy function.

13. The method of claim 1, wherein the context data comprises location data.

14. The method of claim 13, further comprising obtaining, by a computing device, location data based on a GPS.

15. The method of claim 13, further comprising obtaining, by a computing device, location data from a service provider associated with the handheld device.

16. The method of claim 15, further comprising obtaining, by a computing device, location data from a home location register (HLR) associated with the service provider.

17. The method of claim 1, wherein the context data comprises user data.

18. The method of claim 1, wherein the context data comprises usage history associated with the user.

19. The method of claim 1, further comprising receiving a financial request, which comprises an information request, an order execution, or both, from the handheld device.

20. The method of claim 1 wherein the content comprise financial content, which comprises video content, audio content, textual content, securities information, company information, product information, news reports, or any combination thereof.

21. The method of claim 1, further comprising:
associating a pointer to each of the logical segments; and
associating the pointer of each of the logical segments to the list of logical segments.

22. The method of claim 1, wherein the information associated with the context data comprises a keyword.

23. The method of claim 1, wherein the first predetermined period of time comprises a weekday.

24. The method of claim 1, wherein, outside the first predetermined period of time, the context data is based on a personal hobby.

25. The method of claim 1, wherein the web navigation data associated with the user from the immediately preceding second period of time comprises a predetermined number of visited web pages.

26. The method of claim 25, wherein the predetermined number of visited web pages is approximately 10.

27. The method of claim 1, wherein the web navigation data associated with the user from the immediately preceding second period of time comprises a short time period.

28. The method of claim 27, wherein the short time period is approximately 5 minutes.

29. A computer program product, tangibly embodied in a machine-readable storage device, for context-adaptive content distribution to handheld devices, the computer program product including instructions being configured to cause data processing apparatus to:
determine one or more logical segments of content based on information associated the content;
retrieve context data comprising subject matter information, financial portfolio information, regulatory rule information, or any combination thereof, associated with a user, during at least a first predetermined period of time, the context data further comprising web navigation history data associated with the user from an immediately preceding second predetermined period of time;
determine a type of the handheld device associated with the user;
determine a phone carrier for the handheld device based on an IP address associated with the handheld device;
wherein determine the phone carrier for the handheld device comprises:
determine a gateway transmitting requests from the handheld device;
access the IP address, wherein the IP address is associated with the gateway; and
determine the phone carrier, wherein the phone carrier owns the gateway;
determine limitations associated with the handheld device based on the type of the handheld device and the phone carrier, where in the limitations include a screen size for a browser of the handheld device, a maximum refresh rate that the handheld device supports, and a size of memory available on the handheld device;
determine a relevancy function based on the context data;
obtain a list of content, which comprises at least one logical segment, available to the user based on the context data;
rank the list of content by relevancy to the context data based on the relevancy function;
dynamically sort the ranked list of available content; and
transmit a portion of the ranked list to the handheld device according to the sorted order, wherein the portion of the ranked list is determined based on the limitations associated with the type of device and limitations of a network through which the portion of the ranked list is transmitted.

30. An apparatus, tangibly embodied in one or more computer devices, for context-adaptive content distribution to handheld devices, the apparatus comprising:
a server device comprising a database module configured to determine one or more logical segments of content based on information associated with the content and retrieve context data, which comprises subject matter information, financial portfolio information, regulatory rule information, or any combination thereof, associated with a user wherein, during at least a first predetermined period of time, the context data comprises web navigation history data associated with the user from an immediately preceding second predetermined period of time;
a server device comprising an adaptive content module configured to:
determine a type of the handheld device associated with the user;
determine a phone carrier for the handheld device based on an IP address associated with the handheld device;
wherein determine the phone carrier for the handheld device comprises:
determine a gateway transmitting requests from the handheld device;
access the IP address, wherein the IP address is associated with the gateway; and
determine the phone carrier, wherein the phone carrier owns the gateway;
determine limitations associated with the handheld device based on the type of the handheld device and the phone carrier, where in the limitations include a screen size for a browser of the handheld device, a maximum refresh rate that the handheld device supports, and a size of memory available on the handheld device;
determine a relevancy function based on the context data;
obtain a list of content, which comprises at least one logical segment, available to the user based on the context data; and
rank the list of content by relevancy to the context data based on the relevancy function;
dynamically sort the ranked list of available content; and
a server device comprising an application module configured to transmit a portion of the ranked list to the handheld device according to the sorted order, wherein the portion of the ranked list is determined based on the limitations associated with the type of device and limitations of a network through which the portion of the ranked list is transmitted.

31. An apparatus, tangibly embodied in one or more computer devices, for context-adaptive content distribution to handheld devices, the apparatus comprising:

a computing device means for determining one or more logical segments of content based on information associated with the content and retrieving context data, which comprises subject matter information, financial portfolio information, regulatory rule information, or any combination thereof, associated with a user wherein, during at least a first predetermined period of time, the context data comprises web navigation history data associated with the user from an immediately preceding second predetermined period of time;

a computing device means for:

determining a type of the handheld device associated with the user;

determining a phone carrier for the handheld device based on an IP address associated with the handheld device;

wherein determining the phone carrier for the handheld device comprises:

determining a gateway transmitting requests from the handheld device;

accessing the IP address, wherein the IP address is associated with the gateway; and determining the phone carrier, wherein the phone carrier owns the gateway;

determining limitations associated with the handheld device based on the type of the handheld device and the phone carrier, where in the limitations include a screen size for a browser of the handheld device, a maximum refresh rate that the handheld device supports, and a size of memory available on the handheld device;

determining a relevancy function based on the context data;

obtaining a list of content, which comprises at least one logical segment, available to the user based on the context data; and ranking the list of content by relevancy to the context data based on the relevancy function;

dynamically sorting the ranked list of available content based; and a computing device means for transmitting a portion of the ranked list to the handheld device according to the sorted order, wherein the portion of the ranked list is determined based on the limitations associated with the type of device and limitations of a network through which the portion of the ranked list is transmitted.

\* \* \* \* \*

UNITED STATES PATENT AND TRADEMARK OFFICE
CERTIFICATE OF CORRECTION

PATENT NO. : 7,606,799 B2
APPLICATION NO. : 11/033960
DATED : October 20, 2009
INVENTOR(S) : Kalinichenko et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this

Twelfth Day of October, 2010

David J. Kappos
*Director of the United States Patent and Trademark Office*